United States Patent
Drake, Sr. et al.

(10) Patent No.: US 7,196,783 B2
(45) Date of Patent: Mar. 27, 2007

(54) OPTICAL FIBER BUNDLE UTILIZING ELECTROMAGNETIC RADIATION FEEDBACK

(75) Inventors: Ronald E. Drake, Sr., Elbridge, NY (US); Matthew R. Drake, Elbridge, NY (US); Ronald E. Drake, Jr., Elbridge, NY (US)

(73) Assignee: Accurate Machining, Inc., Elbridge, NY (US)

(*) Notice: Subject to any disclaimer, the term of this patent is extended or adjusted under 35 U.S.C. 154(b) by 0 days.

(21) Appl. No.: 10/714,797

(22) Filed: Nov. 17, 2003

(65) Prior Publication Data

US 2004/0135994 A1     Jul. 15, 2004

Related U.S. Application Data

(60) Provisional application No. 60/427,080, filed on Nov. 15, 2002.

(51) Int. Cl.
*G01N 21/00* (2006.01)

(52) U.S. Cl. .................................................... 356/73.1

(58) Field of Classification Search ............... 356/73.1; 385/49, 12, 43; 250/227.14, 227.18
See application file for complete search history.

(56) References Cited

U.S. PATENT DOCUMENTS

| | | | |
|---|---|---|---|
| 3,999,837 A | 12/1976 | Bowen et al. | |
| 4,167,303 A | 9/1979 | Bowen et al. | |
| 4,227,075 A | 10/1980 | Holland | |
| 4,295,738 A * | 10/1981 | Meltz et al. ................ | 356/32 |
| 4,307,934 A | 12/1981 | Palmer | |
| 4,403,860 A | 9/1983 | Pryor | |
| 4,727,858 A | 3/1988 | Gebel et al. | |
| 4,822,127 A | 4/1989 | Kamiya et al. | |
| 4,822,169 A | 4/1989 | Distl et al. | |
| 4,907,876 A | 3/1990 | Suzuki | |
| 4,908,762 A | 3/1990 | Suzuki et al. | |
| 4,927,222 A | 5/1990 | Kamiya et al. | |
| 4,983,014 A | 1/1991 | Nattermann | |
| 5,452,076 A * | 9/1995 | Schopper et al. ........... | 356/128 |
| 5,666,417 A | 9/1997 | Liang et al. | |
| 5,785,658 A | 7/1998 | Benaron et al. | |
| 5,803,575 A | 9/1998 | Ansems et al. | |
| 5,905,830 A | 5/1999 | Chen et al. | |
| 6,084,675 A | 7/2000 | Herzinger et al. | |
| 6,187,030 B1 | 2/2001 | Gart et al. | |

(Continued)

OTHER PUBLICATIONS

IRCON, Fiber Optic Mirage; Product Bulletin, no date.

*Primary Examiner*—Tu T. Nguyen
(74) *Attorney, Agent, or Firm*—George R. McGuire; Bond, Schoeneck & King, PLLC

(57) ABSTRACT

A system for adjusting the light (EMR) input into optical fibers comprising a set of "parasitic" optical fibers randomly distributed among a bundle of transmitting fibers. The parasitic fibers are joined by a separate ferrule from the transmitting fibers and are not connected to an EMR source. As a result, the parasitic fibers pick up and transmit light that is lost from the transmitting fibers for detection by a sensor that determines the amount of light being output from these parasitic fibers and, therefore, the amount of right transmitted by the fiber bundle that is subject to variation, such as variation in the intensity of the light source. The level of light output by the parasitic fibers to the detector determines whether the light (EMR) source needs to be adjusted to maintain a steady output from the transmitting fibers.

9 Claims, 3 Drawing Sheets

U.S. PATENT DOCUMENTS

| | | | |
|---|---|---|---|
| 6,366,347 B1 * | 4/2002 | Boscher et al. | 356/73.1 |
| 6,400,871 B1 | 6/2002 | Minden | |
| 6,482,199 B1 | 11/2002 | Neev | |
| 2002/0080462 A1 | 6/2002 | Patel et al. | |

* cited by examiner

OPTICAL FIBER BUNDLE UTILIZING ELECTROMAGNETIC RADIATION FEEDBACK

BACKGROUND OF THE INVENTION

This application claims priority to provisional application Ser. No. 60/427,080, filed on Nov. 15, 2002.

CROSS-REFERENCE TO RELATED APPLICATION

1. Field of Invention

The present invention relates generally to light transmitting optical fiber bundles and, more particularly, to such bundles that monitor and control the level of output provided by the light (EMR) source to maintain a low variability in the output of the transmitting fibers.

2. Description of Prior Art

Fiber optic fibers are used for transmitting light. The fibers may be flexible or rigid, and a plurality of fibers may be grouped or bundled together in a common ferrule. The ferrule is typically connected to a light (EMR) source that outputs light into the fibers. The light is then transmitted through internal reflection along the length of the fibers and is output at their distal or terminal ends. The light output from the bundle may be used in a wide variety of useful applications, such as dental and surgical instruments, welding equipment, and other apparatus well know in the fiber manufacturing industry.

The amount of light lost through an entire bundle can vary significantly from one moment to the next due to factors such as the orientations of the fibers and the variation in light (EMR) source output. In applications that require a low tolerance for the amount of light output from the bundle, it is desirable to monitor the output levels and adjust the light (EMR) source accordingly.

3. Objects and Advantages

It is a principal object and advantage of the present invention to provide a device that is capable of monitoring the amount of EMR variation during transmission, and adjusting the EMR source accordingly.

It is an additional object and advantage of the present invention to provide a device that may be incorporated into a transmitting fiber bundle.

Other objects and advantages of the present invention will in part be obvious, and in part appear hereinafter.

SUMMARY OF THE INVENTION

In accordance with the foregoing objects and advantages, the present invention provides a set of "parasitic" optical fibers randomly distributed among a bundle of transmitting fibers. The parasitic fibers are joined together via a ferrule that is separate from the ferrule that joins the transmitting fibers. The parasitic fibers are not connected to the EMR source, and have no "original" light being transmitting therethrough. The parasitic fibers do, however, pick up and transmit light that is lost from one or more of the transmitting fibers. The light that is picked up by the parasitic fibers is fed to a sensor/detector that can determine the amount of light being output from these parasitic fibers. Based on factors such as the ratio of parasitic fibers to transmitting fibers and the length of the fibers, the level of light output by the parasitic fibers to the detectors determines whether more or less power is needed to be output from the light source in order to maintain a steady output from the transmitting fibers. The power adjustment determination is performed by a conventional feed-back circuit. Based on the information "fed back" to the light source, the level of light input into the transmitting fibers is adjusted to maintain a relatively constant output by the transmitting fibers (i.e., the greater the loss, the greater the level of power needed to be generated by the source) and account for light output variation.

DETAILED DESCRIPTION

Figure 1:
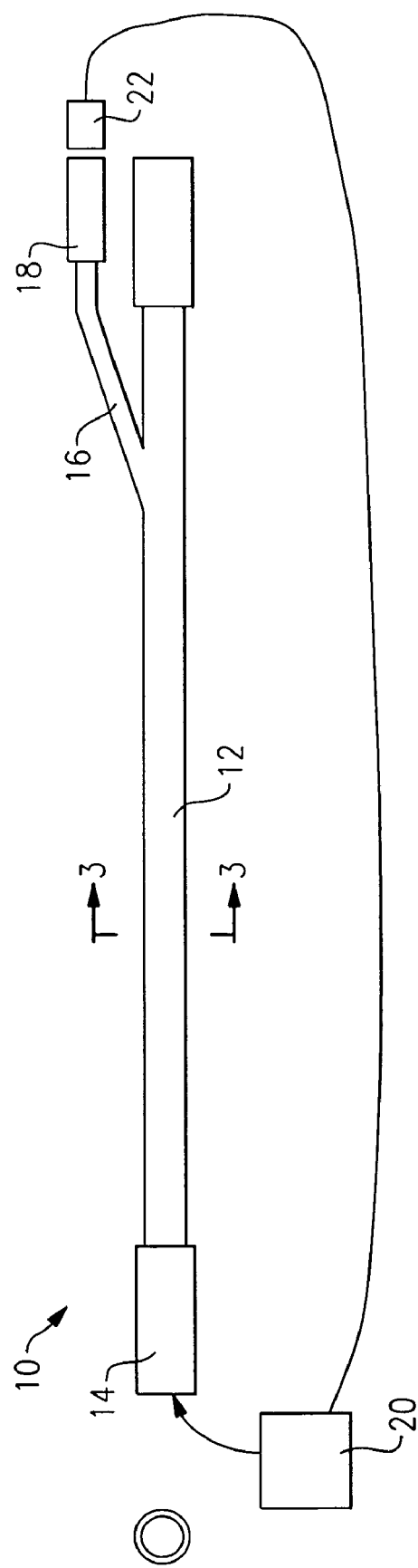
FIG. 1 is a schematic representation of the present invention.

Referring now to the drawing figures, wherein like reference numerals refer to like parts throughout, there is seen in FIG. 1 a device for monitoring the amount of EMR variation during transmission and adjusting the EMR source accordingly designated generally by reference numeral 10. Device 10 comprises a transmission bundle 12 of optical fibers joined together by a common ferrule 14, and a parasitic bundle 16 of optical fibers joined together by a different ferrule 18 and intermingled along at least a portion of its length with transmission bundle 12.

Ferrule 14 interconnects the input end of transmitting fibers 12 to a light (EMR) source 20, while ferrule 18 interconnects one end of parasitic fibers 16 to a detector 22. Hence, transmitting fibers 12 are interconnected with a light (EMR) source 20 for transmitting light through fibers 12 to an optical device (not shown), while parasitic fibers 16 do not include an original light (EMR) source.

Figure 2:
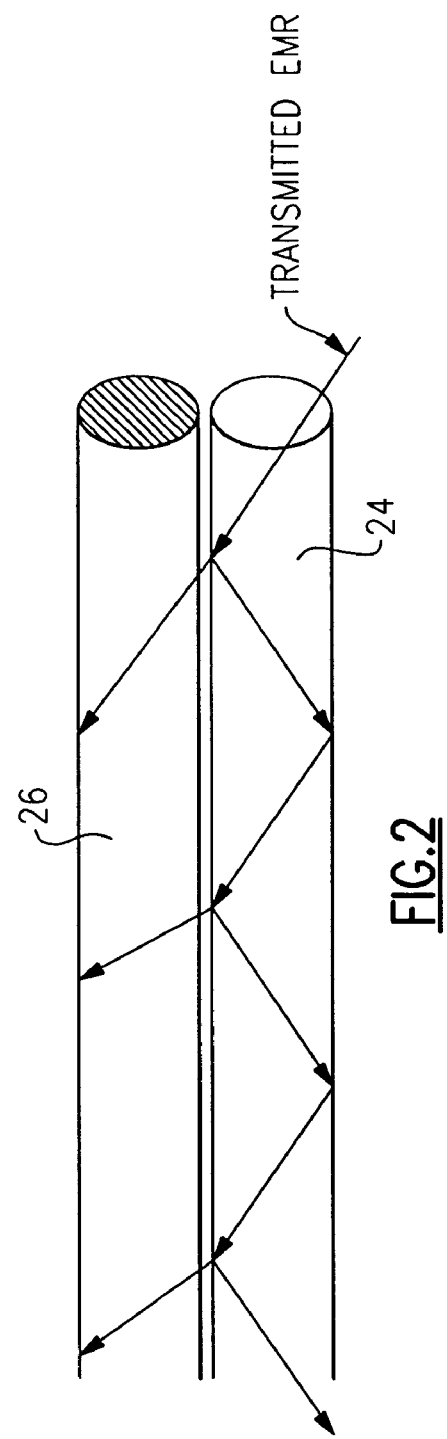
FIG. 2 is an enlarged schematic representation of a parasitic fiber and a transmitting fiber positioned near one another according to the present invention.
Figure 3:
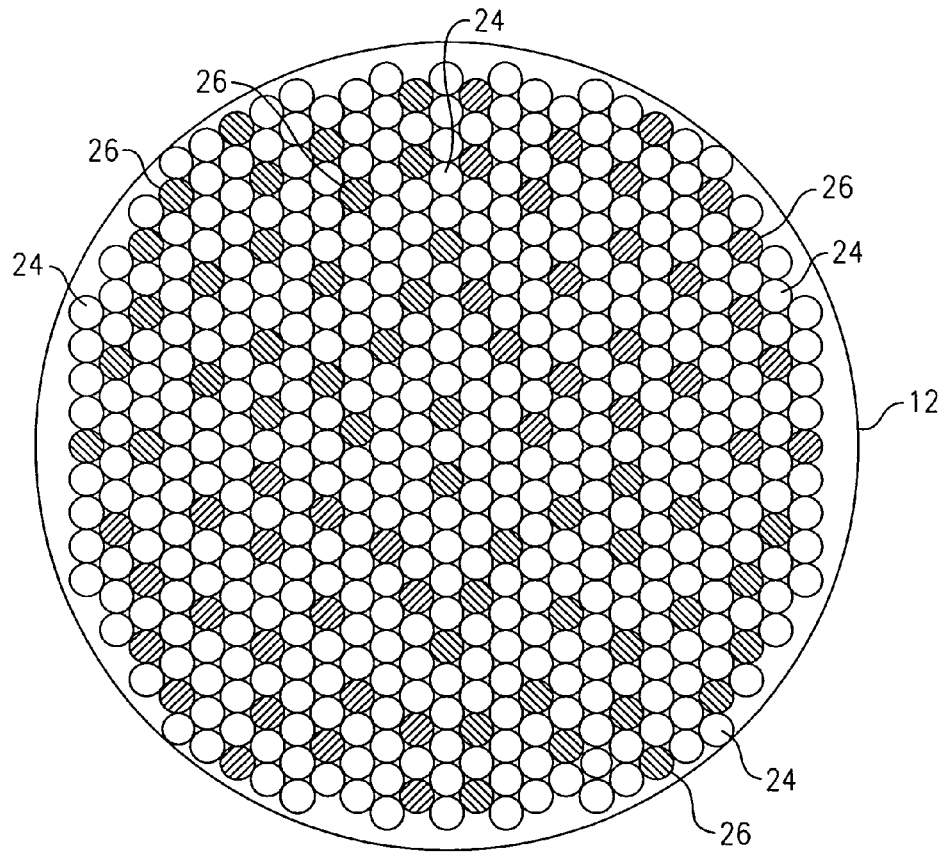
FIG. 3 is a cross-sectional view taken along line A—A of FIG. 1.

With reference to FIGS. 2 and 3, an individual transmitting fiber 24 in transmission bundle 12 transmits light via internal reflection along its lengths. Some portion of that light will be lost due to imperfections in the fibers, the orientation of the fiber, and other physical factors known to contribute to the loss of light from a conventional optical fiber. The light lost from transmitting fiber 24 passes into an individual parasitic fiber 26 in parasitic bundle 16 positioned adjacent thereto.

Figure 5:
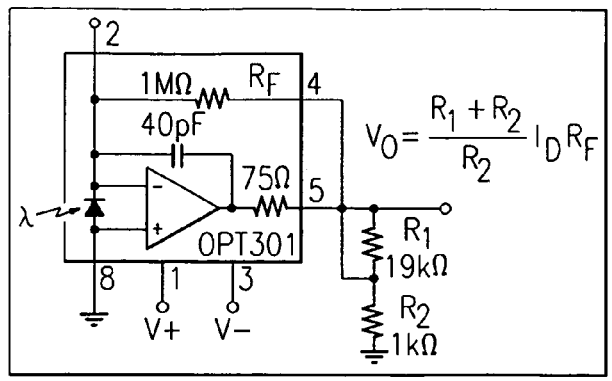
FIGS. 5–7 are schematic representation of feedback circuits that may be incorporated into the present invention for determining power adjustment according to the present invention.
Figure 6:
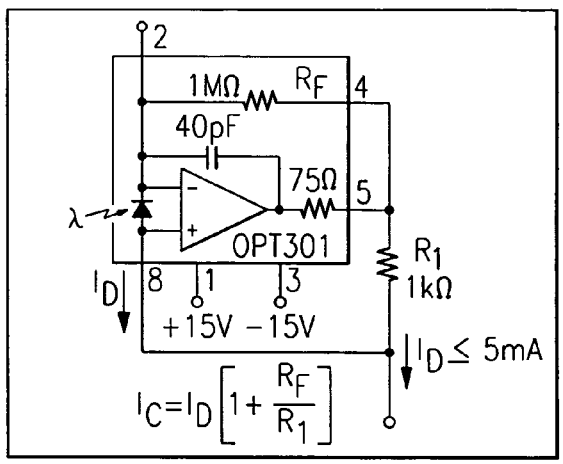
Figure 7:
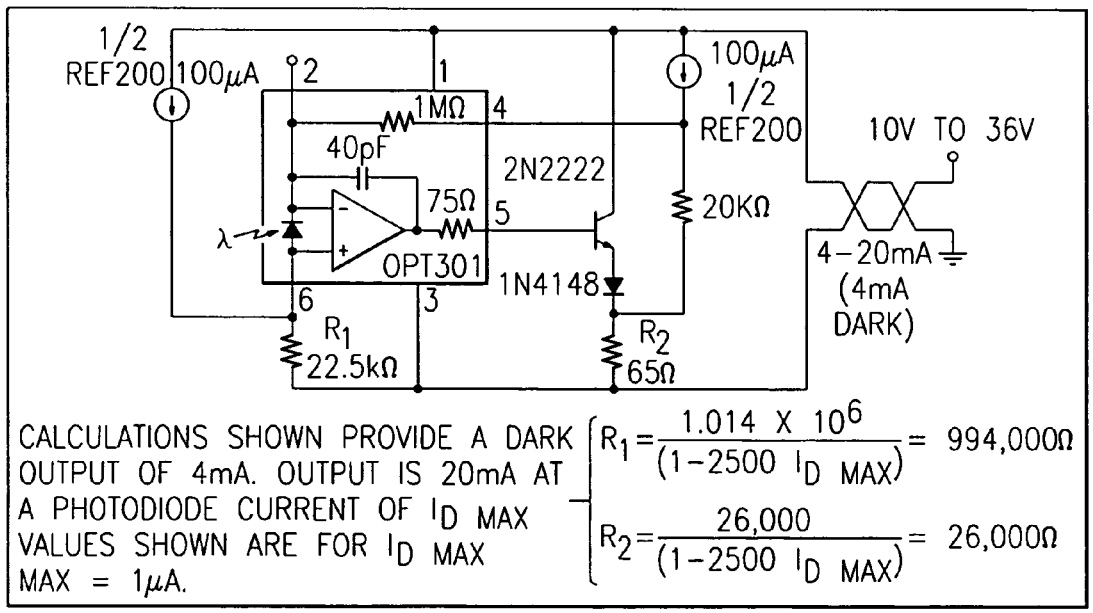

The light received by parasitic fiber 26 is transmitted therealong to detector 22. Detector 22 contains standard feedback circuitry, such as any of the circuits illustrated in FIGS. 5–7, or equivalents thereof. Based on known optical fiber parameters, such as the length of fibers 24 and 26, the ratio of the number of transmitting fibers 24 in transmission bundle 12 to the number of parasitic fibers 26 in parasitic bundle 16, and the amount of light to be delivered by transmission bundle 12, the amount of light (EMR) input by source 20 into transmission bundle 12 can be increased or decreased proportionately to compensate for the amount of light lost or gained by transmission bundle 12. In other words, detector 22 determines the light (EMR) gain or loss from transmission bundle 12 and then attenuates or boosts the light input from source 20 to maintain a constant output.

Figure 4:
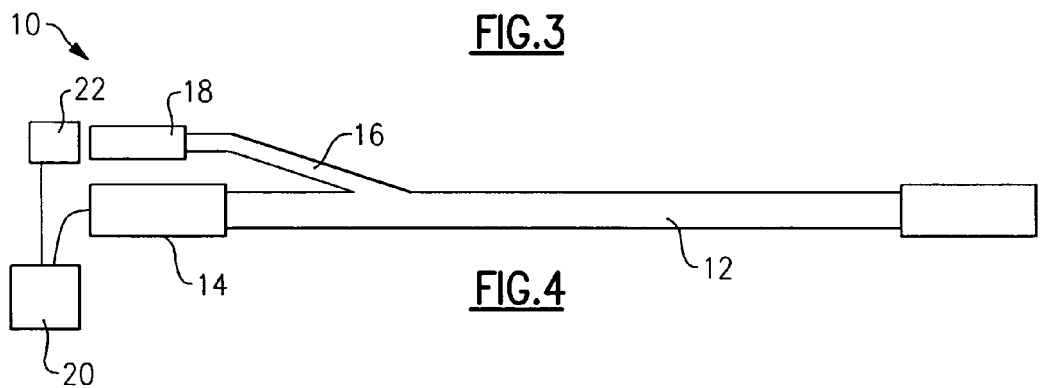
FIG. 4 is a schematic representation of another embodiment of the present invention.

Parasitic bundle 16 can terminate in a detector 22 that is positioned adjacent the output end of the transmission bundle 12, as seen in FIG. 1, or can terminate in a detector 22 that is positioned adjacent source 20, as seen in FIG. 4. If detector 22 is positioned adjacent source 20, parasitic fiber 26 must reflect the light carried therein backwards towards source 20 to reach detector 22. To improve the accuracy of the information provided by detector 22, parasitic fibers 26 may be randomly distributed throughout transmission bundle 12, as illustrated in FIG. 3. The more parasitic fibers 26 provided in bundle 12, the more accurate the loss/gain information will be.

Figure 8:
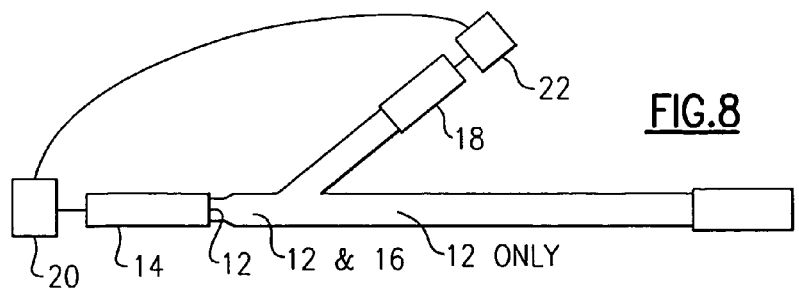
FIG. 8 is a schematic representation of another embodiment of the present invention.

With reference to FIG. 8, parasitic fibers 26 may be positioned just outside of ferrule 14 and randomly distributed as seen in FIG. 3. In the manner, ends of parasitic fibers 26 receive light (EMR) from source 20 that passes through the epoxy in the interspatial gaps of transmitting fibers 24. Conventional epoxies may be used to control the power and/or wavelength of the feedback into the ends of parasitic fibers 26.

What is claimed is:

1. A system for determining the amount of light (EMR) output from an optical fiber bundle including at least one optical fiber interconnected to a light (EMR) source, said system comprising:
   at least one parasitic fiber positioned adjacent to said at least one optical fiber for receiving and transmitting light (EMR) received from said at least one optical fiber; and
   a detector coupled to said at least one parasitic fiber for measuring the amount of Light (EMR) transmitted thereby, wherein said detector is coupled to said light (EMR) source and includes circuitry for adjusting the intensity of said light (EMR) source in response to the intensity of light detected in said parasitic fiber.

2. The system of claim 1, wherein said fiber bundle includes a plurality of optical fibers joined by a ferrule.

3. The system of claim 1, wherein said optical fiber and said parasitic fiber have the same index of refraction.

4. The system of claim 1, wherein said optical fiber has a first index of refraction and said parasitic fiber has a second index of refraction.

5. The system of claim 1, wherein said detector is positioned adjacent to said light (EMR) source.

6. The system of claim 1, wherein said detector is positioned at an end of said optical fiber bundle opposite from said light (EMR) source.

7. The system of claim 1, further comprising a plurality of parasitic fibers distributed throughout said optical fiber bundle.

8. A method of maintaining the output level of a fiber optic bundle including at least one optical fiber interconnected to a light (EMR) source, said method comprising the steps of:
   positioning at least one parasitic fiber adjacent to said at least one optical fiber;
   detecting the intensity of light (EMR) transmitted by said parasitic fiber; and
   adjusting the intensity of said light (EMR) source to maintain the output level of said fiber optical bundle based on the intensity of light (EMR) transmitted by said parasitic fiber.

9. The method of claim 8, wherein said step of adjusting the intensity of said light (EMR) source to maintain the output level of said fiber optical bundle comprises the steps of:
   inputting the intensity of light (EMR) transmitted by said parasitic fiber into a feedback circuit; and
   proportionally adjusting the intensity of said light (EMR) source based on a comparison of the intensity of light (EMR) transmitted by said parasitic fiber and the intensity of light (EMR) transmitted by said optical fiber bundle.

* * * * *

UNITED STATES PATENT AND TRADEMARK OFFICE
CERTIFICATE OF CORRECTION

PATENT NO. : 7,196,783 B2
APPLICATION NO. : 10/714797
DATED : March 27, 2007
INVENTOR(S) : Ronald E. Drake, Sr. et al.

It is certified that error appears in the above-identified patent and that said Letters Patent is hereby corrected as shown below:

TITLE PAGE, ITEM (73)

Assignee:

Please delete "Accurate Machining, Inc." and substitute therefor --Accurate Machining, Inc. d/b/a Acrolite--.

Signed and Sealed this

Eighteenth Day of March, 2008

JON W. DUDAS
*Director of the United States Patent and Trademark Office*